(12) United States Patent
Takenaka et al.

(10) Patent No.: US 8,250,898 B2
(45) Date of Patent: Aug. 28, 2012

(54) BRAKE DISK PRODUCING METHOD AND BRAKE DISK

(75) Inventors: Tadashi Takenaka, Takatsuki (JP); Koji Tamura, Takatsuki (JP)

(73) Assignee: Sunstar Engineering Inc., Takatsuki-shi (JP)

( * ) Notice: Subject to any disclaimer, the term of this patent is extended or adjusted under 35 U.S.C. 154(b) by 0 days.

(21) Appl. No.: 12/923,587

(22) Filed: Sep. 29, 2010

(65) Prior Publication Data

US 2011/0016943 A1   Jan. 27, 2011

Related U.S. Application Data

(62) Division of application No. 10/581,313, filed on Jun. 2, 2006, now abandoned.

(30) Foreign Application Priority Data

Dec. 2, 2003 (JP) .................................. 2003-403674

(51) Int. Cl.
*B21D 22/00* (2006.01)
*B21D 28/00* (2006.01)
(52) U.S. Cl. .......................................... 72/356; 72/340
(58) Field of Classification Search .................... 72/340, 72/412, 414, 470, 474, 475, 356, 379.2; 118/218 XL, 26, 18 A; 29/893.3, 893.34, 557
See application file for complete search history.

(56) References Cited

U.S. PATENT DOCUMENTS

| 3,213,514 | A | * | 10/1965 | Evans | 29/14 |
| 3,580,029 | A | * | 5/1971 | Daniel et al. | 72/108 |
| 3,623,579 | A | * | 11/1971 | Hendrickson et al. | 188/218 XL |
| 5,515,596 | A | * | 5/1996 | Saijo et al. | 72/379.2 |
| 6,223,578 | B1 | * | 5/2001 | Kamijo | 29/893.34 |
| 6,631,791 | B2 | | 10/2003 | Moore et al. | 188/1.11 |
| 2002/0003071 | A1 | | 1/2002 | Torii et al. | 188/218 |
| 2004/0084261 | A1 | | 5/2004 | Burgoon et al. | 188/218 |
| 2004/0200674 | A1 | | 10/2004 | Campbell | 188/26 |

FOREIGN PATENT DOCUMENTS

| JP | 50-109088 | 9/1976 |
| JP | 2000205312 | 7/2000 |
| JP | 2003-147491 | 5/2003 |

* cited by examiner

*Primary Examiner* — Edward Tolan
*Assistant Examiner* — Pradeep C Battula
(74) *Attorney, Agent, or Firm* — Kratz, Quintos & Hanson, LLP

(57) ABSTRACT

A brake disk producing method, comprising a periphery pressing step for forming an outer peripheral shape (5) of a rotor plate (2) into a peripheral shape having recesses and ridges (5a, 5b) repeated in a radial direction, and a chamfering step for forming a chamfered surface (6) by pressing, against a corner portion (2d) on an outer peripheral edge of the rotor plate (2), a die (7), and a brake disk made by the method. Accordingly, it is possible to improve heat radiation capability, reduce the weight and moment of inertia, improve safety in handling, and suppress increase in production costs. Furthermore, by forming the chamfered surface (6), the amount of wear of a brake pad pressed by the brake disk (1) can be reduced, and durability of braking performance can be maintained or improved.

9 Claims, 6 Drawing Sheets

[FIG. 1]
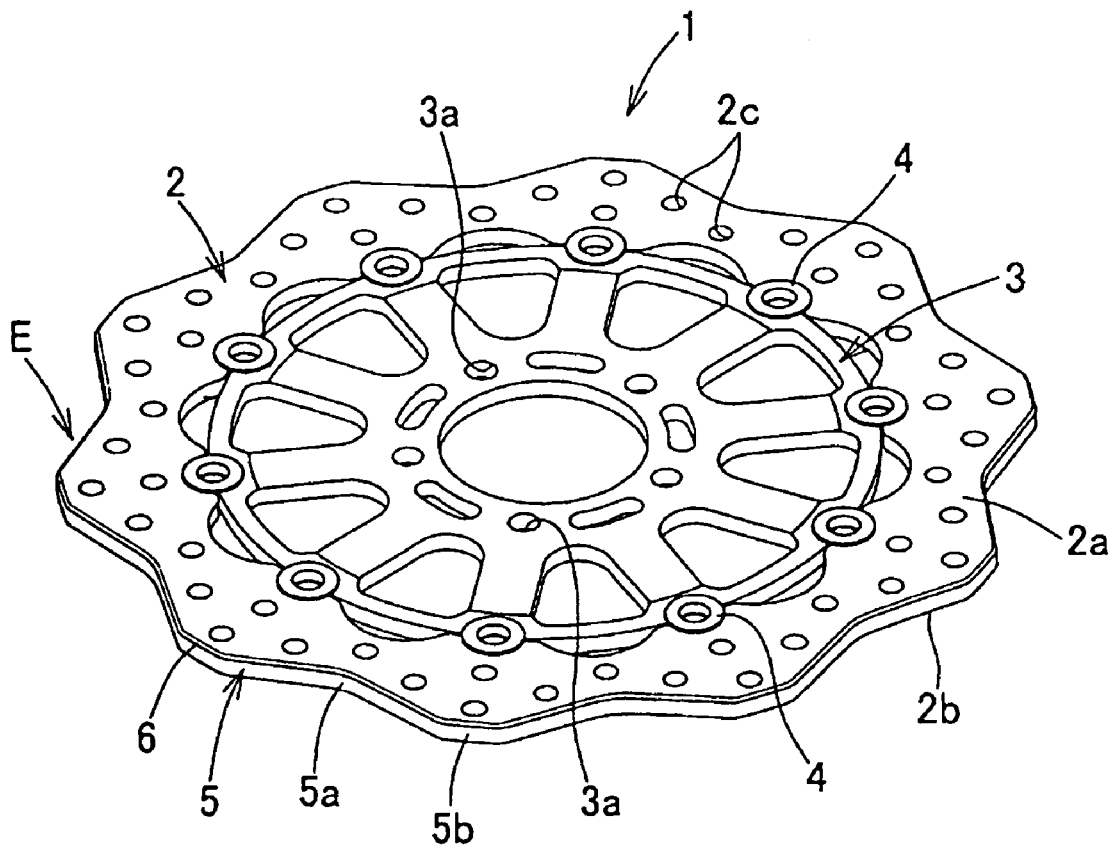
[FIG. 2]
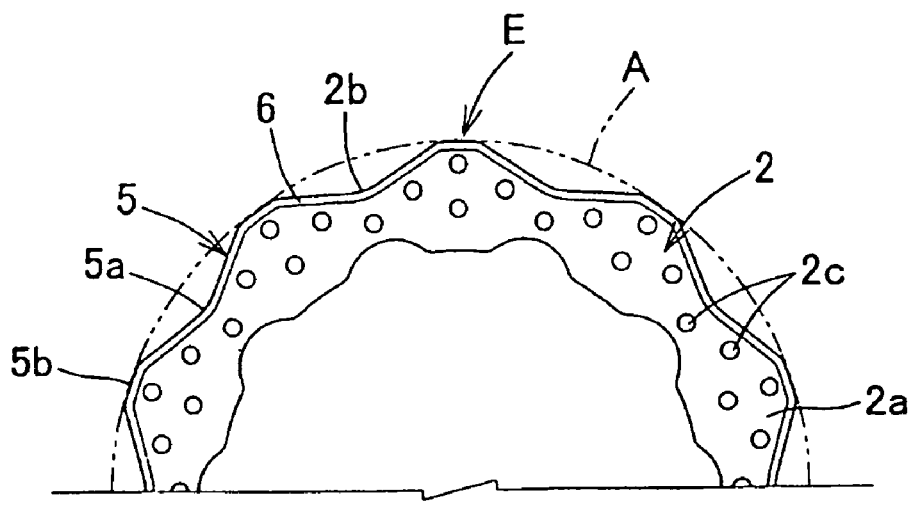

[FIG. 3]
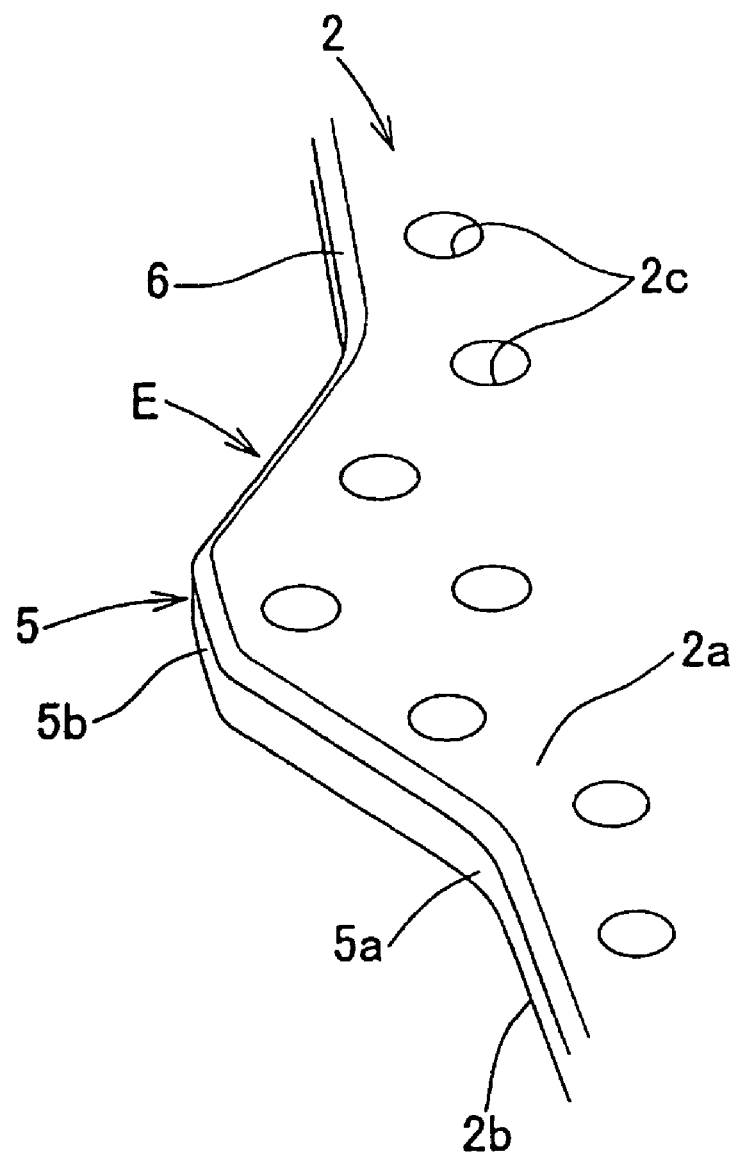

[FIG. 4]
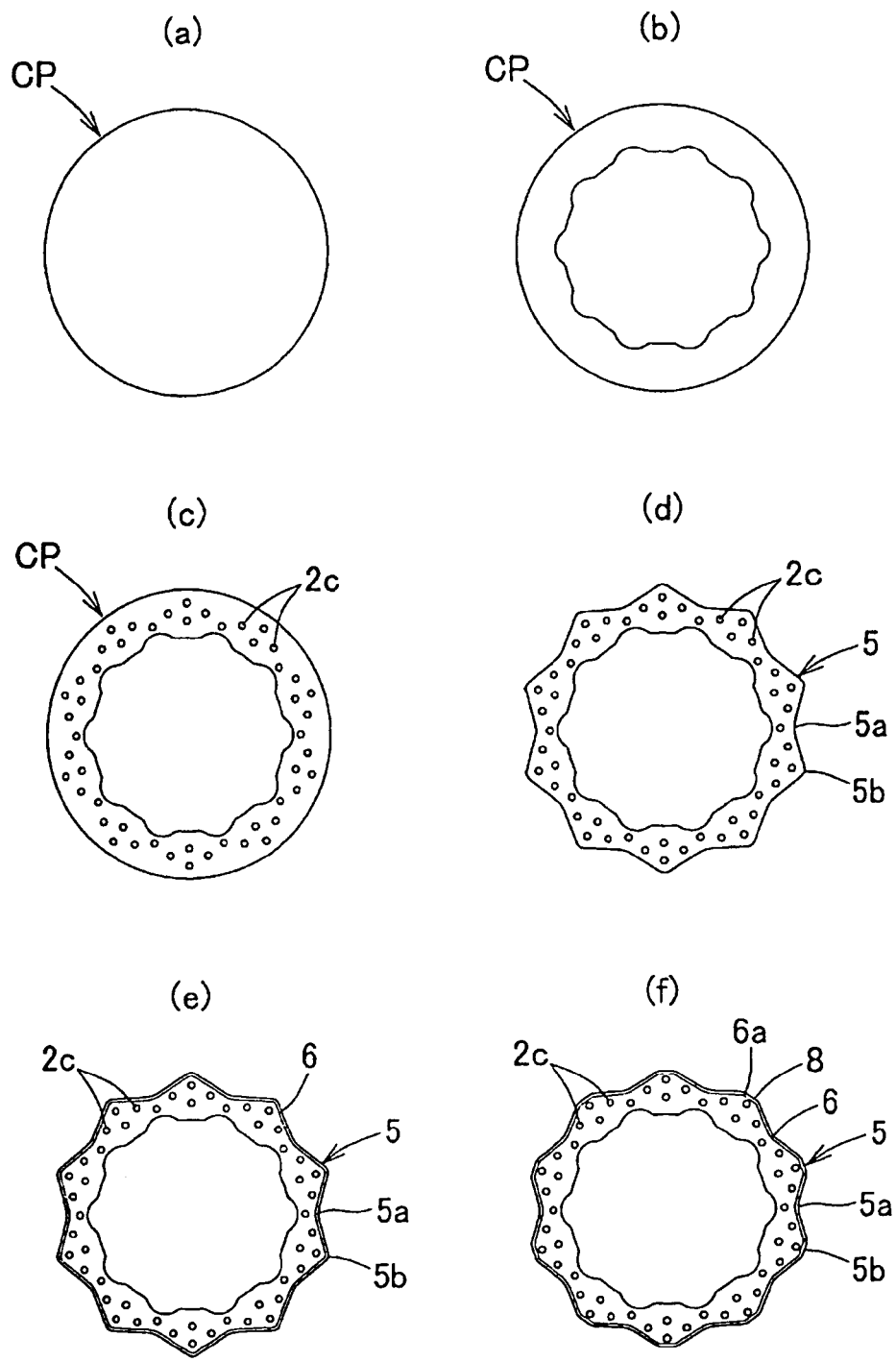

[FIG. 5]
(a)
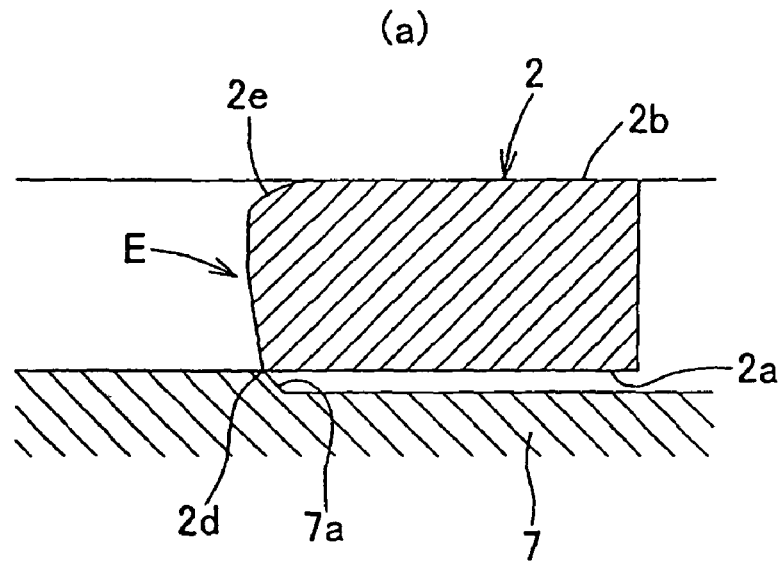
(b)
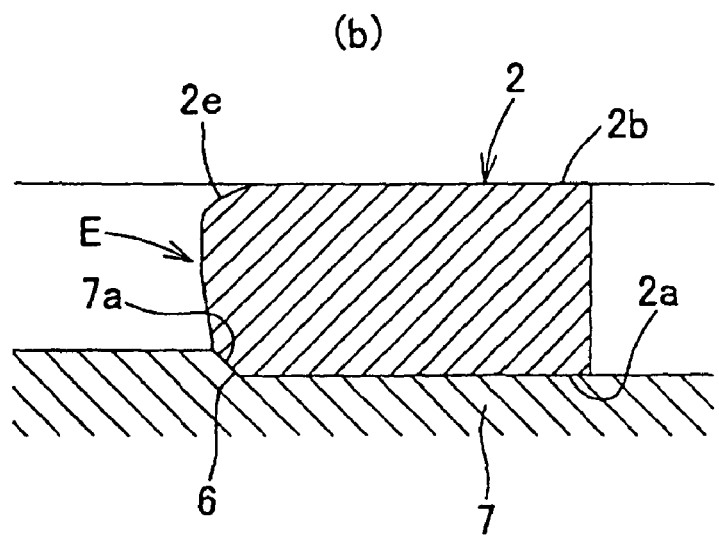
(c)
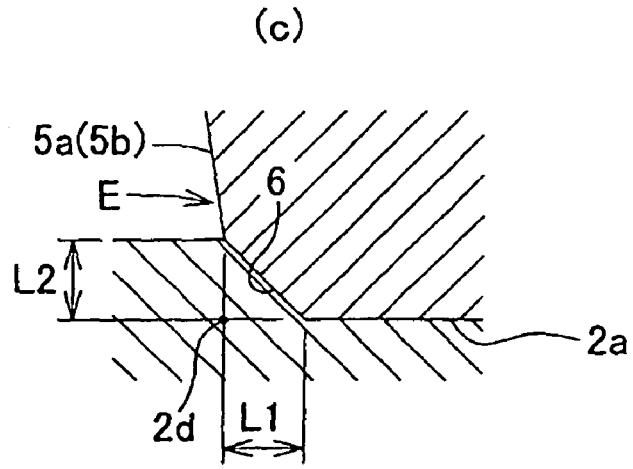

[FIG. 6]
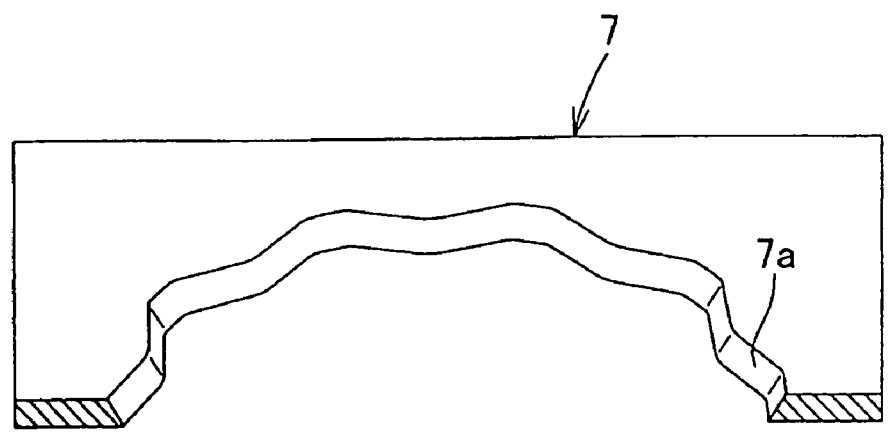
[FIG. 7]
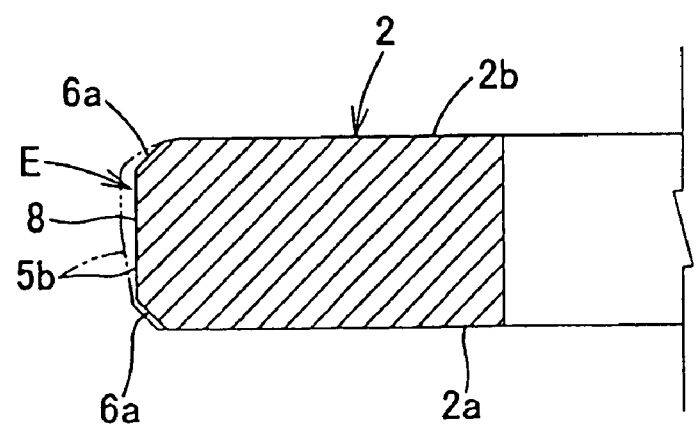

[FIG. 8]
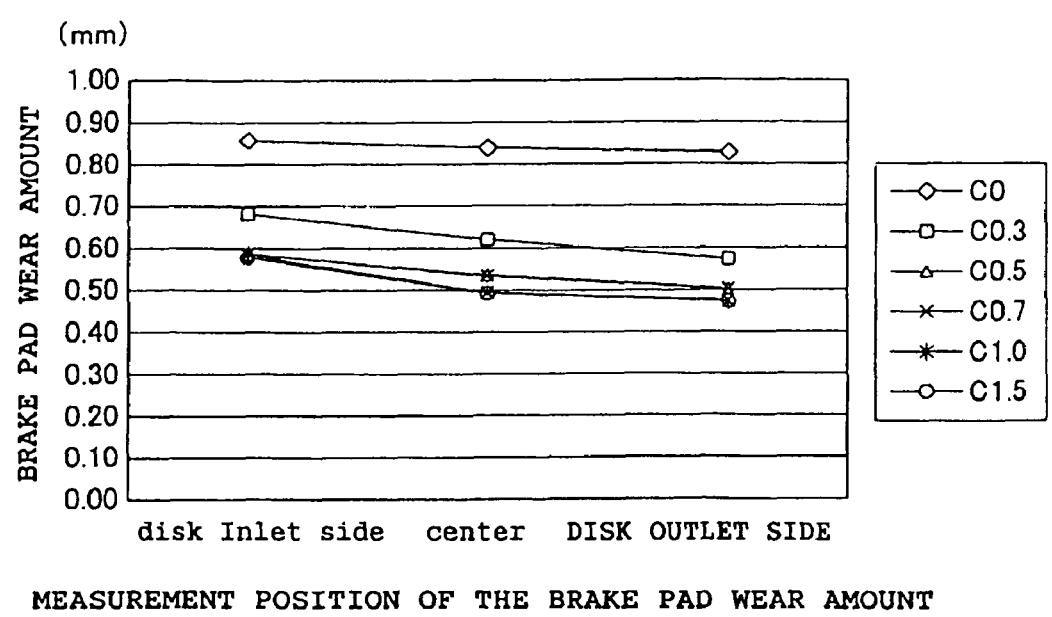
MEASUREMENT POSITION OF THE BRAKE PAD WEAR AMOUNT

BRAKE DISK PRODUCING METHOD AND BRAKE DISK

RELATED APPLICATIONS

This application is a division of U.S. patent application Ser. No. 10/581,313, filed Jun. 2, 2006, now abandoned which application claims priority of Japanese Application No. 2003-403674, filed Dec. 2, 2003, the entire contents of which are incorporated herein by reference.

TECHNICAL FIELD

The present invention relates to a method of producing a brake disk whose outer peripheral shape is formed to have recesses and ridges repeated in the radial direction and to the improvement of the brake disk, in a brake disk of a disk brake device used in a motorcycle and the like.

BACKGROUND ART

Because of its compact size, light weight, large absorbed energy and stable braking force, a disk brake device is used widely as a brake device for a motorcycle, a car, a pickup truck, or the like (see Japanese Patent Application Laid-Open No. 2003-74604, for example). As the main component of such disk brake device, there is a brake disk. The brake disk rotates integrally with a wheel, transmits, to the wheel, braking force caused by the pressure of the brake pad pressing against the both surfaces of the brake disk, and has a function of radiating frictional heat generated between the brake disk and the brake pad at the time of braking. In terms of the outer peripheral shape of the brake disk, there is a circle brake disk as is usually generally used (see Japanese Patent Application Laid-Open No. 2003-74604, for example) and a brake disk having a surface with recesses and ridges repeated in the radial direction (see Japanese Design Registration No. 1179058, and International Patent Publication WO 04/042247, for example).

Although the brake disk, whose outer peripheral shape is formed to have recesses and ridges repeated in the radial direction, is preferred in terms of its improved heat radiation capability, light-weight body, improved design and the like, the brake disk with such outer peripheral shape has problems that the brake pad wears out significantly and the processing cost for molding the brake disk rises. Particularly, in a case of forming a chamfered surface at a corner portion of an outer peripheral edge of the brake disk out of consideration for safety, design and the like, the processing for the formation needs to be carried out for a long period of time using an expensive processing machine or special processing machine such as an NC machining tool or the like since the outer peripheral shape is formed to have recesses and ridges repeated in the radial direction. Therefore, the processing cost for the formation of a chamfered surface increases significantly. For this reason, the brake disk, whose outer peripheral shape is formed to have recesses and ridges repeated in the radial direction, comprises the characteristics of the improved heat radiation capability, the light weight body, the improved design and the like, but has, on the other hand, a problem that such brake disk lacks practicability due to the poor durability of the braking performance and high production costs.

The present invention is contrived in order to solve the problem described above, and an object thereof is to provide a method of producing a highly practical brake disk capable of maintaining the desired performance and at the same time suppressing increase in production costs even in a case of forming a chamfered surface at a corner portion of an outer peripheral edge of a brake disk whose outer peripheral shape is formed to have recesses and ridges repeated in the radial direction, and to provide such brake disk.

DISCLOSURE OF THE INVENTION

In order to solve the above problem, the method of producing a brake disk according to the present invention is a method of producing a brake disk that rotates integrally with a wheel, comprising an outer periphery pressing step for forming an outer peripheral shape of a rotor plate of the brake disk into an outer peripheral shape having recesses and ridges repeated in the radial direction by means of press molding, and a chamfering step for forming a chamfered surface on the rotor plate having the repeated shape formed in the outer periphery pressing step, by pressing, against a corner portion on an outer peripheral edge of the rotor plate having the repeated shape, a die provided with an inclined surface contacting with the corner portion in accordance with the repeated shape, and by plastically deforming the corner portion.

Here, after the chamfering step, the method of producing a brake disk is preferably provided with an outer periphery cut-processing step for machining, after the chamfering step, a part on a leading end side of a ridged portion configuring the repeated shape, in accordance with a circular arc of a circle which is concentric with the center of rotation of the rotor plate, and cut-processing, on the corner portion, a chamfered surface continuing to the chamfered surface obtained by using the die.

Further, between the chamfering step and the outer periphery cut-processing step, the method of producing a brake disk is preferably provided with a heat processing step for performing heat processing in order to cure a braking front face and a braking back face of the rotor plate.

Furthermore, in the chamfering step it is preferred that the chamfered surface be formed using the die, only on a corner portion with no sag, of the corner portions of the outer peripheral edge of the rotor plate, the sag being formed by the press molding in the outer periphery pressing step.

Moreover, the chamfering step is preferably to form a chamfered surface throughout the entire periphery of the rotor plate having the repeated shape formed in the outer periphery pressing step, by pressing, against a corner portion on an outer peripheral edge of the rotor plate having the repeated shape, a die provided with an inclined surface contacting with the corner portion throughout the entire periphery of the rotor plate, in accordance with the repeated shape, and by plastically deforming the corner portion.

It is preferred that a chamfered length of the chamfered surface correspond to the size of the sag of the corner portion on the outer peripheral edge of the rotor plate, the sag being formed in the outer periphery pressing step.

In addition, in the method of producing a brake disk, a chamfered length from the corner portion on the outer peripheral edge of the rotor plate toward a direction of a surface contacting with the brake pad, and a chamfered length from the corner portion toward a direction of an outer peripheral end surface may be greater than or equal to 0.1 mm and less than or equal to 2.0 mm, preferably greater than or equal to 0.1 mm and less than or equal to 1.0 mm, or more preferably greater than or equal to 0.2 mm and less than or equal to 0.7 mm.

In order to solve the problem described above, the brake disk according to the present invention is a brake disk that rotates integrally with a wheel, wherein a recessed and ridged portion which is recessed and protruded in a radial direction is formed repeatedly on an outer peripheral edge of a rotor plate of the brake disk along a circumferential direction, and a chamfered surface is provided on a corner portion of the recessed and ridged portion by means of press molding.

Here, preferably, a cut-processed outer peripheral surface is formed in a leading end portion of a ridged portion of the recessed and ridged portion by cut-processing a part on the leading end side of the ridged portion in accordance with a circular arc of a circle concentric with the center of rotation of the rotor plate, and a chamfered surface which is formed on a corner portion of the cut-processed outer peripheral surface by means of cut-processing is provided so as to continue to the chamfered surface obtained by means of the press molding.

Further, it is preferred that the recessed and ridged portion be formed by means of press molding, that a chamfered surface be formed, by pressing, on the side of the recessed and ridged portion where a corner portion has no sag, and that the side of the recessed and ridged portion where the corner portion has sag be made to serve as an attaching surface to a wheel.

Furthermore, it is preferred that a chamfered length of the chamfered surface correspond to the size of the sag of the corner portion on the outer peripheral edge of the rotor plate, the sag being formed by means of the press molding.

Moreover, in the brake disk a chamfered length from the corner portion on the outer peripheral edge of the rotor plate toward a direction of a surface contacting with the brake pad, and a chamfered length from the corner portion toward a direction of an outer peripheral end surface may be greater than or equal to 0.1 mm and less than or equal to 2.0 mm, preferably greater than or equal to 0.1 mm and less than or equal to 1.0 mm, or more preferably greater than or equal to 0.2 mm and less than or equal to 0.7 mm.

The method of producing a brake disk according to the present invention is a method of producing a brake disk rotating integrally with a wheel, comprising an outer periphery pressing step for forming an outer peripheral shape of a rotor plate of the brake disk into a shape having recesses and ridges repeated in the radial direction by means of press molding, and a chamfering step for forming a chamfered surface on the rotor plate having the repeated shape molded in the outer periphery pressing step, by pressing, against a corner portion on an outer peripheral edge of the rotor plate having the repeated shape, a die provided with an inclined surface contacting with the corner portion in accordance with the repeated shape, and by plastically deforming the corner portion. Therefore, by means of the outer periphery pressing step, the repeated shape of recesses and ridges in the radial direction can be processed using a pressing device and the processing time can be reduced, thus it is possible to realize a brake disk capable of improving heat radiation capability, reducing the weight thereof, reducing moment of inertia, and suppressing increase in production costs. In addition, by means of the chamfering step, a chamfered surface can be molded on the rotor plate having the repeated shape by using a pressing device and the processing time can be reduced, thus it is possible to realize a brake disk capable of improving safety in handling and controlling production costs. Also, the amount of wear of a brake pad pressed by the brake disk is suppressed by forming the chamfered surface, so that durability of braking performance can be improved. Moreover, a brake disk capable of improving design can be realized by means of an external appearance of the repeated shape of recesses and ridges and of the chamfered surface.

After the chamfering step, the method of producing a brake disk is provided with an outer periphery cut-processing step for machining a part of a leading end of a ridged portion configuring the repeated shape, in accordance with a circular arc of a circle which is concentric with the center of rotation of the rotor plate, and cut-processing, on the corner portion, a chamfered surface continuing to the chamfered surface obtained by using the die. Therefore, by means of the outer periphery cut-processing step, a part on a leading end side of the ridged portion can be processed using a lathe or the like and the processing time can be reduced, thus production costs can be controlled and accuracy of the shape of a portion of the rotor plate where an outer diameter is largest and deflection accuracy at the time of rotation can be enhanced. Further, by machining and processing at high accuracy, the effect of suppressing the amount of wear of the brake pad and design can be improved.

Further, between the chamfering step and the outer periphery cut-processing step, the method of producing a brake disk is provided with a heat processing step for performing heat processing in order to cure a braking front face and a braking back face of the rotor plate. Therefore, long-term reliability of the disk brake device can be improved by improving wear resistance of the rotor plate.

Furthermore, in the chamfering step the chamfered surface is formed using the die, only on a corner portion with no sag, of the corner portions of the outer peripheral edge of the rotor plate, the sag being formed by the press molding in the outer periphery pressing step. Therefore, it is possible to improve productivity while securing safety in handling the rotor plate and to suppress increase in production costs.

Furthermore, the chamfering step is to form a chamfered surface throughout the entire periphery of the rotor plate having the repeated shape formed in the outer periphery pressing step, by pressing, against a corner portion on an outer peripheral edge of the rotor plate having the repeated shape, a die provided with an inclined surface contacting with the corner portion throughout the entire periphery of the rotor plate, in accordance with the repeated shape, and by plastically deforming the corner portion. Therefore, increase in production costs can be further suppressed.

Also, a chamfered length of the chamfered surface corresponds to the size of the sag of the corner portion on the outer peripheral edge of the rotor plate, the sag being formed by means of the press molding, thus an integrated impression can be obtained to enhance design. Moreover, the amount of wear of the brake pads on both sides which are pressed by the brake disk produced in the production method can be reduced, and the amount of wear of the both brake pads can be made substantially even.

In addition, in the method of producing a brake disk, the a chamfered length from the corner portion on the outer peripheral edge of the rotor plate toward a direction of a surface contacting with the brake pad, and a chamfered length from the corner portion toward a direction of an outer peripheral end surface are greater than or equal to 0.1 mm and less than or equal to 2.0 mm, preferably greater than or equal to 0.1 mm and less than or equal to 1.0 mm, or more preferably greater than or equal to 0.2 mm and less than or equal to 0.7 mm. Hence, the effect of preventing nonuniform wear of the brake pad pressed by the brake disk produced in the production method, and the effect of reducing the amount of wear become significant.

The brake disk according to the present invention is a brake disk rotating integrally with a wheel, wherein a recessed and ridged portion which is uneven in a radial direction is formed repeatedly on an outer peripheral edge of a rotor plate of the brake disk along a circumferential direction, and a chamfered surface is provided on a corner portion of the recessed and ridged portion by means of press molding. Accordingly, it is possible to improve heat radiation capability, reduce the weight and moment of inertia, improve safety in handling, and suppress increase in production costs. Further, the amount of wear of the brake pad pressed by the brake disk can be reduced by forming the chamfered surface. In addition, an impression of the repeated shape of recesses and ridges and of the chamfered surface can improve the design.

Further, a cut-processed outer peripheral surface is formed in a leading end portion of a ridged portion of the recessed and ridged portion by cut-processing a part on the leading end side of the ridged portion in accordance with a circular arc of a circle concentric with the center of rotation of the rotor plate, and a chamfered surface which is cut-processed on a corner portion of the cut-processed outer peripheral surface by means of cut-processing is provided so as to continue to the chamfered surface obtained by means of the press molding. Accordingly, it is possible to improve heat radiation capability, reduce the weight thereof, reduce moment of inertia, improve safety in handling, and suppress increase in production costs. In addition, an impression of the repeated shape of recesses and ridges and of the chamfered surface can improve the design. Further, accuracy of the shape of the portion of the rotor plate where an outer diameter is largest and deflection accuracy at the time of rotation can be enhanced.

Further, the recessed and ridged portion is formed by means of press molding, a chamfered surface is formed, by pressing, on each side of the recessed and ridged portion where a corner portion has no sag, and the side of the recessed and ridged portion where a corner portion has sag is made to serve as an attaching surface to the wheel. Accordingly, increase in production costs can be further suppressed.

Further, a chamfered length of the chamfered surface corresponds to the size of the sag of the corner portion on the outer peripheral edge of the rotor plate, the sag being formed by means of the press molding, thus an integrated impression can be obtained to enhance design. Moreover, the amount of wear of the brake pads on both sides which are pressed by the brake disk can be reduced, and the amount of wear of the both brake pads can be made substantially even.

In addition, in the brake disk, a chamfered length from the corner portion on the outer peripheral edge of the rotor plate toward a direction of a surface contacting with the brake pad, and a chamfered length from the corner portion toward a direction of an outer peripheral end surface are greater than or equal to 0.1 mm and less than or equal to 2.0 mm, preferably greater than or equal to 0.1 mm and less than or equal to 1.0 mm, or more preferably greater than or equal to 0.2 mm and less than or equal to 0.7 mm. Hence, the effect of preventing nonuniform wear of the brake pad pressed by the brake disk, and the effect of reducing the amount of wear become significant.

BRIEF DESCRIPTION OF THE DRAWINGS

FIG. 1 is a perspective view showing a configuration example of a brake disk according to an embodiment of the present invention, wherein a floating brake disk is shown;

FIG. 2 is an explanatory diagram of an outer peripheral shape of an outer rotor plate;

FIG. 3 is a perspective view showing an enlarged outer peripheral portion of the outer rotor plate;

FIG. 4 is an explanatory diagram showing an example of a production process for the outer rotor plate according to the embodiment of the present invention;

FIG. 5 is a cross-sectional view showing a method of molding a chamfered surface on a corner portion of an outer peripheral edge of the outer rotor plate, wherein FIG. 5(a) shows a state of the chamfered surface before molded, FIG. 5(b) shows a state of the chamfered surface after molded, and FIG. 5(c) shows all components surrounding the chamfered surface;

FIG. 6 is a partial cross-sectional perspective view of a die which is used for molding the chamfered surface on the corner portion on the outer peripheral edge of the outer rotor plate;

FIG. 7 is a cross-sectional view showing an example of cut-processing a part on a leading end side of a ridged portion on the outer peripheral shape of the outer rotor plate by machining, the cut-processing being performed after performing heat processing; and FIG. 8 is a figure showing changes of the amount of wear of a brake pad in accordance with a chamfered length of the chamfered surface which is formed on the corner portion on the outer peripheral edge of the outer rotor plate.

BEST MODE FOR CARRYING OUT THE INVENTION

FIG. 1 is a perspective view showing a configuration example of a brake disk according to an embodiment of the present invention, wherein a floating brake disk is shown. The brake disk 1 comprises an outer rotor plate 2, an inner rotor plate 3 provided with attached holes 3a, 3a, . . . for a wheel which is not shown, and a floating pin 4, 4, . . . connecting the outer rotor plate 2 and the inner rotor plate 3. Only the inner rotor plate 3 is fixed to the wheel by means of the attached holes 3a, 3a, . . . by using bolts, and the outer rotor plate 2 is not fixed to the wheel. In this manner, the inner rotor plate 3 which is a portion attached to the wheel and the outer rotor plate 2 which is a friction portion against which an unshown brake pad is pressed are independent from each other, so that distortion of the outer rotor plate 2 caused by telescopic deformation of the outer plate 2 by the frictional heat can be suppressed. Therefore, this brake disk 1 is characterized in that operation of pressing the outer rotor plate 2 by means of a brake pad is stabled, and has other characteristics.

The outer rotor plate 2 and the floating pin 4, 4, . . . are made of metal such as stainless steel, and the inner rotor plate 3 is made of metal such as aluminum alloy. As described above, since the inner rotor plate 3 is less subject to the friction heat, aluminum alloy having relatively large coefficient of thermal expansion can be used for the primary objective of reducing the weight of the brake disk. It should be noted that the size of the outer rotor plate 2 is, for example, approximately 300 mm at external diameter thereof and approximately 6 mm at thickness thereof. Further, a braking front face 2a and a braking back face 2b of the outer rotor plate 2, which are surfaces contacting with the brake pad, are subjected to heat processing such as induction of hardening for curing the braking surfaces in order to improve wear resistance.

FIG. 2 is an explanatory diagram of an outer peripheral shape of the outer rotor plate 2. FIG. 3 is a perspective view showing an enlarged outer peripheral portion of the outer rotor plate. The outer peripheral shape 5 of the outer rotor plate 2 is a repeated shape of recesses and ridges (a recess portion 5a and a ridged portion 5b) in the radial direction, and, as shown in FIG. 2, partially overlaps with a circular arc of a circle A which is concentric with the center of rotation of the wheel, i.e. the centers of rotation of the outer rotor plate 2 and the inner rotor plate 3. Such shape of the outer rotor plate 2 can improve heat radiation capability by increasing the surface area, reduce the weight and moment of inertia, and improve the design. It should be noted that the pitch of the recesses and ridges (the number of recesses and ridges) in the repeated shape of recesses and ridges in the radial direction on the outer periphery of the outer rotor plate 2, the depth of the recess portion 5a, and the like can be set accordingly from the perspective of the improvement of heat radiation capability by increasing the surface area, reduction of the weight and moment of inertia, and improvement of the design. Moreover, an inner peripheral shape of the outer rotor plate may be taken as the repeated shape of recesses and ridges in the radial direction.

Of corner portions on an outer peripheral edge of the outer rotor plate 2, i.e., a corner portion on an outer peripheral side of the braking back face 2b facing the wheel and a corner portion on an outer peripheral side of the braking front face 2a which is the back of the braking back face 2b, at least the corner portion on the outer peripheral side of the braking front face 2a is formed with a chamfered surface 6. By forming the chamfered surface 6, safety in handling can be improved and the amount of wear of the brake pad can be reduced as will be described hereinafter. Since the formation of the chamfered surface 6 evenly on the corner portion of the braking front face 2a is performed in a section which can be viewed well from the outside if the brake disk is used particularly in a motorcycle or the like, thus such formation is preferred in terms of the design. Moreover, the outer rotor plate 2 is formed with a number of punched holes 2c, 2c, . . . in an axial direction of rotation of the wheel, so that improvement of heat radiation capability by increasing the surface area, improvement of the braking performance by reducing the weight and moment of inertia, improvement of performance of eliminating scrap and dirt causing wear of the brake disk, and improvement of the design can be achieved.

FIG. 4 is an explanatory diagram showing an example of a production process for the outer rotor plate according to the embodiment of the present invention. First of all, a plate like material made of stainless steel or the like, for example, is punched out by means of pressing to form a disk CP which is the base of the outer rotor plate 2 (step (a)). Next, the inside of the disk CP is punched out by pressing to form the shape on an inner diameter side of the outer rotor plate 2 (step (b)). Next, the punched holes 2c, 2c, . . . of the outer rotor plate 2 are formed on the disk CP by means of press molding (step (c)). Next, the outer peripheral shape 5 of the outer rotor plate 2, i.e. the repeated shape of recesses and ridges (the recess portion 5a and the ridged portion 5b) in the radial direction is formed into, for example, a roughly corrugated or trapezoidal repeated shape by means of press molding (outer periphery pressing step (d)).

FIG. 5 is a cross-sectional view showing a method of molding the chamfered surface 6 on the corner portion of the outer peripheral edge 2d of the outer rotor plate 2, wherein FIG. 5(a) shows a state of the chamfered surface 6 before molded, FIG. 5(b) shows a state of the chamfered surface 6 after molded, and FIG. 5(c) shows all components surrounding the chamfered surface. Also, FIG. 6 is a partial cross-sectional perspective view of a die which is used for molding the chamfered surface 6 on the corner portion on the outer peripheral edge of the outer rotor plate 2. A die 7 for molding the chamfered surface 6 on a corner portion 2d of the outer peripheral edge of the outer rotor plate 2 is provided with an inclined surface 7a which contacts with the corner portion 2d throughout the entire periphery of the outer rotor plate 2 in accordance with the repeated shape of recesses and ridges in the radial direction of the rotor plate, the repeated shape being molded in the outer periphery pressing step (d) shown in FIG. 4.

Therefore, the inclined surface 7a of the die 7 is pressed against the corner portion 2d throughout the entire periphery of the outer rotor plate 2 having the repeated shape, in accordance with the repeated shape, and the corner portion 2d is plastically deformed, whereby the chamfered surface 6 can be formed at once on the corner portion 2d of the outer peripheral edge throughout the entire periphery of the outer rotor plate 2 having the repeated shape (chamfering step (e) shown in FIG. 4).

It should be rioted that in this case the angle of chamfer can be changed by changing the angle of inclination of the inclined surface 7a of the die 7, so that the chamfered surface 6 having a general angle of chamfer of 45°, an angle of chamfer of 30°, an angle of chamfer of 60° or the like can be formed easily. For example, in the case where the angle of chamfer is 45°, the angle of inclination of the inclined surface 7a may be set to 45°, and it is possible to easily form the chamfered surface 6 of approximately 0.1 mm through 2 mm or in which a chamfered length L1 from the corner portion 2d on the outer peripheral edge of the outer rotor plate 2 toward the direction of the braking front face 2a (direction of the surface contacting with the brake pad) and a chamfered length L2 from the corner portion 2d toward a direction of an outer periphery end surface E is approximately equivalent to a sag 2e of the corner portion on the outer peripheral edge of the outer rotor plate 2.

As described above, after the outer periphery pressing step (d) shown in FIG. 4, the chamfered surface 6 may be formed at once on the complicated outer peripheral shape of the outer rotor plate 2 by means of the chamfering step (e) shown in FIG. 4, or may be formed in a plurality of separate steps, whereby the processing time and processing costs can be reduced significantly.

Furthermore, the inclined surface 7a of the die 7 does not have to be a inclined surface extending throughout the entire periphery of the corner portion 2d on the outer peripheral edge of the outer rotor plate 2, thus it may be an inclined surface contacting only with a part of the entire periphery. However, if the inclined surface 7a of the die 7 extends throughout the entire periphery of the corner portion 2d of the outer peripheral edge of the outer plate 2, the chamfered surface 6 can be formed as described above, thus the effects of reducing processing time and processing costs is significant. Moreover, the die 7 does not have to be one unit, thus separate dies may be used.

The chamfered surface 6 may be formed on both the braking front face 2a and the braking back face 2b of the outer rotor plate 2. However, as shown in FIG. 5, if the sag 2e is generated in the preceding press working, the portion with sag does not disturb safety in handling the outer rotor plate 2, thus chamfering of the portion with sag may be omitted. However, the chamfered surface 6 is certainly formed on the corner portion of the braking front face 2a of the outer rotor plate 2, as described above. Therefore, by allowing the sag 2e to be generated on the braking back face 2b of the outer rotor plate 2, it is only necessary that the chamfered surface 6 be formed only on the corner portion of the braking front face 2a of the outer rotor plate 2 by means of the chamfering step (e) shown in FIG. 4, so that the processing time and processing costs can be reduced. Moreover, the formation of the chamfered surface 6 does not degrade safety in handling and the design.

Next, the surfaces contacting with the brake pads on both the braking front face 2a and braking back face 2b of the outer rotor plate 2 are subjected to heat processing such as induction of hardening for curing the braking surfaces in order to improve wear resistance. Steps of the heat processing are not shown in FIG. 4.

FIG. 7 is a cross-sectional view showing an example of cut-processing a part on a leading end side of the ridged portion 5b on the outer peripheral shape of the outer rotor plate 2 by performing machining such as lathe turning, cutting, grinding or the like, the cut-processing being performed after the heat processing. The part of the ridged portion 5b on the outer peripheral shape of the outer rotor plate 2 after the heat processing is subjected to cut-processing by machining in accordance with the circular arc of the circle A (see FIG. 2) which is concentric with the center of rotation of the outer rotor plate 2, whereby a cut-processed outer peripheral surface 8 is formed. Further, a corner portion generated by the machining is also subjected to cut-processing by machining, whereby a chamfered surface 6a, 6a is formed as shown in FIG. 7 (outer periphery cut-processing step (f) shown in FIG. 4).

As described above, by performing cut-processing on the part of the leading end side of the ridged portion 5b on the outer peripheral shape of the outer rotor plate 2 after the heat processing, machining is also performed on a section which is deformed in the heat processing, thus accuracy of the shape of a portion on the outer peripheral shape of the outer rotor plate 2 where an outer diameter is largest and deflection accuracy at the time of rotation can be enhanced. Moreover, the chamfered surface 6a same as the chamfered surface 6 molded in the chamfering step (e) of FIG. 4 can be formed on a section where a chamfered surface no longer exists due to the cut-processing of the part of the leading end side of the ridged portion 5b, thus safety in handling can be improved and the integrated impression of the chamfered surfaces 6 and 6a can enhance the design. In addition, the outer periphery cut-processing step (f) of FIG. 4 is a simple machining processing performed in accordance with the circular arc of the circle A (see FIG. 2) which is concentric with the center of rotation of the outer rotor plate 2, thus the processing time and processing costs can be controlled. The effect of controlling the processing time and processing costs is significant if lathe turning is performed.

FIG. 8 is a figure showing changes of the amount of wear of the brake pad in accordance with the chamfered length of the chamfered surface which is formed on the corner portion on the outer peripheral edge of the outer rotor plate, and the present measurement is pursuant to the endurance strength test of Society of Automotive Engineers standard (Section 7.2 in JASO C 419-89) (set reduced speed is 1.2 G). The positions for measuring the amount of wear of the both brake pads contacting with the braking front face 2a and braking back face 2b respectively of the outer rotor plate 2 of the disk 1 are where the recess portion 5a of the outer rotor plate 2 is held between the both brake pads, which are locations of inner, center, and outer sides in respective radial directions of the inlet side, the outlet side, the center of the inlet side and outlet side of the brake pad with respect to the direction of rotation of the outer rotor plate 2. Specifically, the inlet side, center and outlet side of the outer rotor plate 2 in radial directions are taken as three measuring positions, and the total of eighteen brake pads on the both sides are measured. The amount of wear of the brake pad shown in FIG. 8 indicates a result of measurement on the braking front and back surfaces on the inlet side, center, and outlet side.

It should be noted that, in measurement of the amount of wear, the chamfering length L1 in the direction of the surface contacting with the brake pad and the chamfering length L2 from the corner portion toward the direction of the outer periphery end surface E (see FIG. 5©) are changed to 0.3 mm (C0.3), 0.5 mm (C0.5), 0.7 mm (C0.7), 1.0 mm (C1.0), and 1.5 mm (C1.5), and a result obtained by measuring the amount of wear when the chamfered surface is not formed on the recess portion 5a (C0) is shown.

As shown in FIG. 8, when comparing the case where the chamfered surface is not formed (C0) with the case where the chamfered length is 0.3 mm (C0.3), approximately 20% through 30% of the amount of wear is reduced, and when comparing the former case with the case where the chamfered length is 0.5 mm (C0.5), approximately 30% through 45% of the amount of wear is reduced. Furthermore, it is clear that the reduction of the amount of wear of the brake pad plateaus when the chamfered length is larger than 0.5 mm and is 0.7 mm (C0.7), 1.0 mm (C1.0), and 1.5 mm (C1.5). It should be noted that, if the chamfered length is too large (for example, if the chamfered length becomes larger than 2.0 mm), the widths of the braking front and back faces of the outer rotor plate 2 which contact with the brake pads become narrower than the width of the brake pad, thus nonuniform wear of the brake pad occurs, which is not desirable.

In consideration of the reduction effects of the amount of wear of the brake pad, effect of improving the design, non-uniform wear of the pad, and some other elements caused by the formation of the chamfered surface, for the chamfered length of the chamfered surface, it is preferred that the chamfered length L1 from the corner portion on the outer peripheral edge of the outer rotor plate toward the direction of the surface contacting with the brake pad and the chamfered length L2 from the corner portion toward the direction of the outer periphery end surface be set to greater than or equal to 0.1 mm and less than or equal to 2.0 mm. Moreover, the chamfered lengths L1 and L2 may be set so as to correspond to the size of the sag which is substantially equivalent to the size of the sag in the corner portion on the outer peripheral edge of the outer rotor plate 2, which is formed in the outer periphery pressing step. In this manner, by allowing the chamfered length to correspond to the size of the sag of the corner portion of the outer peripheral edge of the outer rotor plate, the integrated impression thereof can enhance the design. Moreover, the amount of wear of the both brake pads pressed by the brake disk produced in the production method can be reduced, and the amount of wear of the both brake pads can be made substantially even.

Further, according to the results of measuring the amount of wear of the brake pad as shown in FIG. 8, for the chamfered length of the chamfered surface, it is preferred that the chamfered length L1 from the corner portion on the outer peripheral edge of the outer rotor plate toward the direction of the surface contacting with the brake pad and the chamfered length L2 from the corner portion toward the direction of the outer periphery end surface be set to greater than or equal to 0.1 mm and less than or equal to 1.0 mm, or more preferably greater than or equal to 0.2 mm and less than or equal to 0.7 mm, from the perspective of, mainly, reducing the amount of wear of the brake pad effectively.

The above has described a case of performing machining by means of the outer periphery cut-processing step (f) shown in FIG. 4. However, depending on the required specifications or the like, the external shape of the outer rotor plate may be formed into a desired final shape by performing press working by means of the outer peripheral pressing step (d), without performing machining in the outer periphery cut-processing step (f).

Further, the above has described when using the floating brake disk, but the present invention is not limited to the application to the floating brake disk, but also can be applied to a rigid brake disk in which an outer rotor plate and an inner rotor plate are not separated or independent but are obtained as an integrated rotor plate.

What is claimed is:

1. A method of producing a brake disk that rotates integrally with a wheel, comprising an outer periphery pressing step for forming an outer peripheral shape of a rotor plate of the brake disk into an outer peripheral shape having recesses and ridges repeated in the radial direction by means of press molding, a chamfering step for forming a chamfered surface on the rotor plate having the repeated shape formed in the outer periphery pressing step, by pressing, against a corner portion on an outer peripheral edge of the rotor plate having the repeated shape, a die provided with an inclined surface contacting with the corner portion in accordance with the repeated shape, and by plastically deforming the corner portion, and an outer periphery cut-processing step for machining, after the chamfering step, a part on a leading end side of a ridged portion configuring the repeated shape, in accordance with a circular arc of a circle which is concentric with the center of rotation of the rotor plate, and cut-processing, on the corner portion, a chamfered surface continuing to the chamfered surface obtained by using the die.

2. The method of producing a brake disk according to claim 1, comprising, between the chamfering step and the outer periphery cut-processing step, a heat processing step for performing heat processing in order to cure a braking front face and a braking back face of the rotor plate.

3. The method of producing a brake disk according to claim 2, wherein, in the chamfering step, a chamfered surface is formed using the die, only on a corner portion with no sag, of the corner portions of the outer peripheral edge of the rotor plate, the sag being formed in the outer periphery pressing step at the corner portion first formed by the punch in the outer periphery pressing step by means of press molding.

4. The method of producing a brake disk according to claim 1, wherein, in the chamfering step, a chamfered surface is formed using the die, only on a corner portion with no sag, of the corner portions of the outer peripheral edge of the rotor plate, the sag being formed in the outer periphery pressing step at the corner portion first formed by the punch in the outer periphery pressing step by means of press molding.

5. A method of producing a brake disk that rotates integrally with a wheel, comprising an outer periphery pressing step for forming an outer peripheral shape of a rotor plate of the brake disk into an outer peripheral shape having recesses and ridges repeated in the radial direction by means of press molding, said press molding being carried out with a die block and a punch, forming sag at a corner portion firstly formed by the punch among two corner portions in the outer periphery of the rotor plate, forming no sag at a corner portion finally formed by the punch, and a chamfering step for forming a chamfered surface on the rotor plate having the repeated shape formed in the outer periphery pressing step, by pressing, against at least one of two corner portions on an outer peripheral edge of the rotor plate having the repeated shape, a die provided with an inclined surface contacting with the at least one corner portion in accordance with the repeated shape, and by plastically deforming the at least one corner portion, wherein the at least one corner portion is the corner portion with no sag, and wherein a chamfered length of the chamfered surface corresponds to the size of the sag of the corner portion on the outer peripheral edge of the rotor plate.

6. The method of producing a brake disk according to claim 5, wherein the chamfering step is to form a chamfered surface throughout the entire periphery of the rotor plate having the repeated shape formed in the outer periphery pressing step, by pressing, against the at least one corner portion of two corner portions on an outer peripheral edge of the rotor plate having the repeated shape, a die provided with an inclined surface contacting with the at least one corner portion of two corner portions throughout the entire periphery of the rotor plate, in accordance with the repeated shape, and by plastically deforming the at least one corner portion of two corner portions.

7. The method of producing a brake disk according to claim 5, wherein a chamfered length from the corner portion on the outer peripheral edge of the rotor plate toward a direction of a surface contacting with the brake pad, and a chamfered length from the corner portion toward a direction of an outer peripheral end surface are greater than or equal to 0.1 mm and less than or equal to 2.0 mm.

8. The method of producing a brake disk according to claim 5, wherein a chamfered length from the corner portion on the outer peripheral edge of the rotor plate toward a direction of a surface contacting with the brake pad, and a chamfered length from the corner portion toward a direction of an outer peripheral end surface are greater than or equal to 0.1 mm and less than or equal to 1.0 mm.

9. The method of producing a brake disk according to claim 5, wherein a chamfered length from the corner portion on the outer peripheral edge of the rotor plate toward a direction of a surface contacting with the brake pad, and a chamfered length from the corner portion toward a direction of an outer peripheral end surface are greater than or equal to 0.2 mm and less than or equal to 0.7 mm.

* * * * *